(12) United States Patent
Scribano et al.

(10) Patent No.: US 9,313,013 B2
(45) Date of Patent: *Apr. 12, 2016

(54) MITIGATING TRANSMISSION INTERFERENCE BETWEEN DIGITAL RADIO AND BROADBAND COMMUNICATION DEVICES

(71) Applicant: MOTOROLA SOLUTIONS, INC, Schaumburg, IL (US)

(72) Inventors: Gino A. Scribano, Saint Charles, IL (US); Michael H. Baker, Elmhurst, IL (US); Xiaowei Jin, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,885

(22) Filed: Feb. 26, 2015

(65) Prior Publication Data

US 2015/0180639 A1 Jun. 25, 2015

Related U.S. Application Data

(63) Continuation of application No. 13/295,963, filed on Nov. 14, 2011, now Pat. No. 8,995,918.

(51) Int. Cl.
*H04B 1/00* (2006.01)
*H04B 15/00* (2006.01)
(Continued)

(52) U.S. Cl.
CPC ............ *H04L 5/0062* (2013.01); *H04W 4/008* (2013.01); *H04W 16/14* (2013.01); *H04W 72/082* (2013.01)

(58) Field of Classification Search
USPC .............. 455/456.1, 456.3, 456.6, 41.1, 41.2, 455/556.1, 556.2, 522, 507, 509, 512, 513, 455/515, 516, 63.1, 63.2, 67.11, 67.13, 68, 455/69; 370/445, 447, 448
See application file for complete search history.

(56) References Cited

U.S. PATENT DOCUMENTS 7,016,319 B2 * 3/2006 Baum et al. .................... 370/329
7,366,471 B1 * 4/2008 Kitchin ........................ 455/63.1
(Continued)

FOREIGN PATENT DOCUMENTS

EP 1 261 228 A2 11/2002
EP 1 388 951 A2 2/2004
(Continued)

OTHER PUBLICATIONS

Chiasserini C.F. and Rao R.R. et al., "Coexistence mechanishms for interference mitigation between IEEE 802.11 WLANs and Bluetooth," Twenty-First Annual Joint Conference of the IEEE Computer and Communications Societies. INFOCOM 2002 Proceedings, IEEE vol. 2, pp. 590-598.

(Continued)

*Primary Examiner* — Tuan A Tran
(74) *Attorney, Agent, or Firm* — Daniel R. Bestor (57) ABSTRACT

A broadband device (105) can detect a proximate narrowband transmission (152) from a narrowband communication device (145). The narrowband transmission (152) can be in close enough proximity (155) to at least one bearer channel of the broadband device (105) to result in interference on the narrowband reception (152) when the broadband device (105) is transmitting and the narrowband communication device (145) is concurrently receiving. Responsive to the detecting, the broadband device (105) can gate a broadband transmission (142) to ensure the broadband transmission (142) does not interfere with the proximate narrowband reception (152). In absence of detecting the narrowband transmission (152), the broadband transmission (142) from the broadband device (105) would not be gated.

20 Claims, 5 Drawing Sheets

(51) Int. Cl.
*H04L 5/00* (2006.01)
*H04W 16/14* (2009.01)
*H04W 72/08* (2009.01)
*H04W 4/00* (2009.01)

(56) References Cited

U.S. PATENT DOCUMENTS

| | | | |
|---|---|---|---|
| 7,593,691 B2 | 9/2009 | Karabinis | |
| 7,848,221 B2 | 12/2010 | Ding et al. | |
| 7,860,521 B2* | 12/2010 | Chen et al. | 455/501 |
| 8,107,880 B2 | 1/2012 | Okker et al. | |
| 8,346,171 B1* | 1/2013 | Mack | 455/63.1 |
| 8,504,090 B2 | 8/2013 | Klein et al. | |
| 8,520,544 B2 | 8/2013 | Aguirre et al. | |
| 8,526,410 B2* | 9/2013 | Li et al. | 370/342 |
| 8,588,699 B2* | 11/2013 | Park et al. | 455/63.1 |
| 8,594,576 B2* | 11/2013 | Palanki | 455/63.1 |
| 8,655,304 B2 | 2/2014 | Makhlouf et al. | |
| 8,676,216 B2* | 3/2014 | Zhou et al. | 455/444 |
| 8,681,660 B2* | 3/2014 | Xu et al. | 370/255 |
| 8,731,568 B1 | 5/2014 | Epstein et al. | |
| 8,830,985 B2* | 9/2014 | Xu et al. | 370/350 |
| 9,008,020 B2 | 4/2015 | Yacobi et al. | |
| 9,066,363 B2 | 6/2015 | Anderson et al. | |
| 2001/0016499 A1* | 8/2001 | Hamabe | 455/454 |
| 2005/0096062 A1 | 5/2005 | Ji et al. | |
| 2006/0114864 A1 | 6/2006 | Fuccello et al. | |
| 2006/0292986 A1 | 12/2006 | Bitran et al. | |
| 2008/0108363 A1 | 5/2008 | Yu et al. | |
| 2008/0279130 A1 | 11/2008 | Lewis | |
| 2009/0010186 A1* | 1/2009 | Li et al. | 370/310 |
| 2009/0147763 A1 | 6/2009 | Desai et al. | |
| 2009/0170542 A1 | 7/2009 | Chen et al. | |
| 2009/0196210 A1 | 8/2009 | Desai | |
| 2009/0225717 A1 | 9/2009 | Banerjea | |
| 2010/0029289 A1* | 2/2010 | Love et al. | 455/450 |
| 2010/0054158 A1 | 3/2010 | Mathai et al. | |
| 2010/0056136 A1 | 3/2010 | Zhu | |
| 2010/0081449 A1 | 4/2010 | Chaudhri et al. | |
| 2010/0128689 A1 | 5/2010 | Yoon et al. | |
| 2010/0159972 A1 | 6/2010 | Cho et al. | |
| 2010/0195584 A1 | 8/2010 | Wilhelmsson et al. | |
| 2010/0197235 A1 | 8/2010 | Wilhelmsson | |
| 2010/0304705 A1 | 12/2010 | Hursey | |
| 2010/0319033 A1 | 12/2010 | Juhani et al. | |
| 2011/0047230 A1 | 2/2011 | McGee | |
| 2011/0110255 A1* | 5/2011 | Park et al. | 370/252 |
| 2011/0136497 A1 | 6/2011 | Youtz et al. | |
| 2011/0176497 A1* | 7/2011 | Gopalakrishnan | 370/329 |
| 2011/0243047 A1 | 10/2011 | Dayal et al. | |
| 2012/0020256 A1* | 1/2012 | Tujkovic et al. | 370/278 |
| 2012/0040715 A1 | 2/2012 | Fu et al. | |
| 2012/0082140 A1 | 4/2012 | Lin et al. | |
| 2012/0100860 A1 | 4/2012 | Lei et al. | |
| 2012/0164948 A1 | 6/2012 | Narasimha et al. | |
| 2012/0314598 A1 | 12/2012 | Sadek et al. | |
| 2013/0183904 A1 | 7/2013 | Hiben et al. | |

FOREIGN PATENT DOCUMENTS

| | | |
|---|---|---|
| EP | 1 392 024 A2 | 2/2004 |
| EP | 2 186 265 A1 | 5/2010 |
| WO | 2010/039562 A1 | 4/2010 |
| WO | 2010/080669 A3 | 7/2010 |
| WO | 2010/112066 A1 | 10/2010 |
| WO | 2010/141448 A1 | 12/2010 |
| WO | 2010/147719 A1 | 12/2010 |
| WO | 2011/017577 A2 | 2/2011 |
| WO | 2011/072884 A1 | 6/2011 |
| WO | 2011/119750 A1 | 9/2011 |
| WO | 2011/123582 A1 | 10/2011 |
| WO | 2012/057590 A2 | 5/2012 |

OTHER PUBLICATIONS

HP Invent—"Wi-FiTM and BluetoothTM," Interferences Issues, Jan. 2002, pp. 1-6.

Jing X. et al., "Spectrum co-existence of IEEE 802.11b and 802.16a networks using the CSCC etiquette protocol," First IEEE International Symposium on New Frontiers in Dynamic Spectrum Access Networks, Nov. 8-11, 2005, pp. 243-250.

Jing, X. et al., "Distributed Coordination Schemes for Multi-Radio Co-existence in Dense Spectrum Environments: An Experimental Study on the ORBIT Testbed," 3rd IEEE Symposium on New Frontiers in Dynamic Spectrum Access Networks, Oct. 14-17, 2008, pp. 1-10.

Jing, X., "Spectrum Coordination Protocols and Algorithms for Cognitive Radio Networks," Jan. 31, 2008, XP055043291, pp. 1-120.

Motorola Solutions: "B26 Uplink LTE UE TO PS BS Co-Existence," 3GPP Draft; R4-113745 B26 UL LTE TO PS Co-Existence, 3RD Generation Partnership Project (3GPP) Mobile Competence Centre, Sophia-Antipolis Cedex, France, Jun. 22, 2011, pp. 1-6.

Motorola Solutions: "Co-Existence Study Involving PSNB Systems," 3GPP Draft; R4-B26AH-0043 PSNB Co-Existence, 3RD Generation Partnership Project (3GPP) Mobile Competence Centre, Sophia-Antipolis Cedex, France, Jan. 1, 2012, pp. 1-4.

Motorola Solutions: "B26 Downlink LTE TO PS Co-Existence", 3GPP Draft; R4-113744 B26 DL LTE TO PS Co-Existence, 3RD Generation Partnership Project (3GPP), Mobile Competence Centre, France, vol. RAN WG4, No. Roma; 20110627, Jun. 22, 2011, pp. 1-6, XP050542860.

Motorola Solutions: "Co-Existence Issue for 700MHz Digital Divident Band", 3GPP Draft; R4-113746_Co-Existance Issue For 700 MHZ DD, 3RD Generation Partnership Project (3GPP), Mobile Competence Centre, France, vol. RAN NG4, No. Roma; 20110627, Jun. 22, 2011, pp. 1-4, XP050542862.

Non-Final Office Action mailed Jun. 7, 2013, in U.S. Appl. No. 13/340,057, Anderson, J. S. et al., filed Dec. 29, 2011.

Final Office Action mailed Jan. 6, 2014, in U.S. Appl. No. 13/340,057, Anderson, J. S. et al., filed Dec. 29, 2011.

Advisory Action mailed Apr. 22, 2014, in U.S. Appl. No. 13/340,057, Anderson, J. S. et al., filed Dec. 29, 2011.

Notice of Allowance mailed Jan. 5, 2015, in U.S. Appl. No. 13/340,057, Anderson, J. S. et al., filed Dec. 29, 2011.

Notice of Allowance mailed Mar. 24, 2015, in U.S. Appl. No. 13/340,057, Anderson, J. S. et al., filed Dec. 29, 2011.

Notice of Allowance mailed Apr. 27, 2015, in U.S. Appl. No. 13/340,057, Anderson, J. S. et al., filed Dec. 29, 2011.

Non-Final Office Action mailed Feb. 5, 2014, in U.S. Appl. No. 13/351,771, Hiben, B. M. et al., filed Jan. 17, 2012.

Final Office Action mailed May 16, 2014, in U.S. Appl. No. 13/351,771, Hiben, B. M. et al., filed Jan. 17, 2012.

Non-Final Office Action mailed Jun. 24, 2014, in U.S. Appl. No. 13/351,771, Hiben, B. M. et al., filed Jan. 17, 2012.

Final Office Action mailed Dec. 4, 2014, in U.S. Appl. No. 13/351,771, Hiben, B. M. et al., filed Jan. 17, 2012.

Non-Final Office Action mailed Jul. 29, 2015, in U.S. Appl. No. 13/351,771, Hiben, B. M. et al., filed Jan. 17, 2012.

Notice of Allowance mailed Dec. 23, 2014, in U.S. Appl. No. 13/295,963, Scribano, G. A. et al., filed Dec. 29, 2011.

Patent Examination Report No. 1 mailed Dec. 23, 2014, for Australian Patent Application No. 2012340003, filed Oct. 30, 2012.

Notice of Grant mailed Aug. 27, 2015, for Australian Patent Application No. 2012340003, filed Oct. 30, 2012.

Patent Examination Report No. 1 mailed Feb. 27, 2015, for Australian Patent Application No. 2013209991, filed Jan. 10, 2013.

Notice of Grant mailed Oct. 1, 2015, for Australian Patent Application No. 2013209991, filed Jan. 10, 2013.

Office Action mailed Jul. 29, 2015, in European Patent Application No. 12 787 592.0, filed Oct. 30, 2012.

Non-Final Office Action mailed Jun. 23, 2014, in U.S. Appl. No. 13/601,432, Yacobi A.A. et al., filed Aug. 31, 2012.

(56) References Cited

OTHER PUBLICATIONS

Notice of Allowance mailed Jan. 23, 2015, in U.S. Appl. No. 13/601,432, Yacobi A.A. et al., filed Aug. 31, 2012.
International Search Report and Written Opinion for International Patent Application No. PCT/US2012/062574, mailed Mar. 6, 2013.
International Search Report and Written Opinion for International Patent Application No. PCT/US2012/069278, mailed May 2, 2013.
International Search Report and Written Opinion for International Patent Application No. PCT/US2013/055917, mailed Jan. 8, 2014.
International Search Report and Written Opinion for International Patent Application No. PCT/US2013/021045, mailed May 21, 2013.

* cited by examiner

MITIGATING TRANSMISSION INTERFERENCE BETWEEN DIGITAL RADIO AND BROADBAND COMMUNICATION DEVICES

CROSS-REFERENCE TO RELATED APPLICATION

The present application is a continuation application of, and claims priority to, U.S. patent application Ser. No. 13/295,963, filed in the United States Patent Office on Nov. 14, 2011, and entitled "Mitigating Transmission Interference Between Digital Radio and Broadband Communication Devices," which application is commonly owned with the present application and the entire contents of which application are incorporated herein by reference.

FIELD OF THE DISCLOSURE

The present invention relates to wireless communications and, more particularly, to mitigating transmission interference between digital radio and broadband communication devices.

BACKGROUND

The concept of signal interference is well known in the field of communications, and, more specifically, wireless communications. Many situations exist where signal interference between multiple wireless devices degrades the performance of one or more of the devices, based on signal strengths.

For example, in the home, signals from a microwave, cordless phone, and wireless access point often interfere with each other. Depending on the relative strengths of the signals (i.e., weaker signals introduce less interference), the interference results in a slow download, the inability to communicate with a Web server, or a "bad" phone connection (i.e., unable to clearly hear the other party).

In such a situation, the interference is of little consequence, though annoying to most users. However, there are situations, such as those dealing with the wireless communications devices used by public safety personnel, where the interference has potentially problematic consequences, particularly when working in a hazardous environment.

For example, a police officer typically uses a two-way radio for communicating with a dispatcher or other officers on the same digital radio frequency. These digital radio communications may be subject to interference by other wireless devices (e.g., cell phones, vehicular subscriber modems, etc.) that operate on nearby frequency bands, when the officer is near to these wireless devices. In such a situation, the officers' time-sensitive communications may become unclear, completely garbled, or be delayed.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the invention address the mitigation of interference between the transmissions of broadband user equipment made in the B13 and/or B14 frequency bands and a digital radio communications device, when the digital radio communications device is within a predefined proximity of the broadband user equipment. A transmission interference mitigator can be installed upon the broadband user equipment. The transmission interference mitigator can be configured to detect the proximity of nearby digital radio communications devices, and gate transmissions of the broadband user equipment for a predetermined delay interval, representing an estimated amount of time required by the digital radio communications device to receive a response to its transmission.

Figure 1:
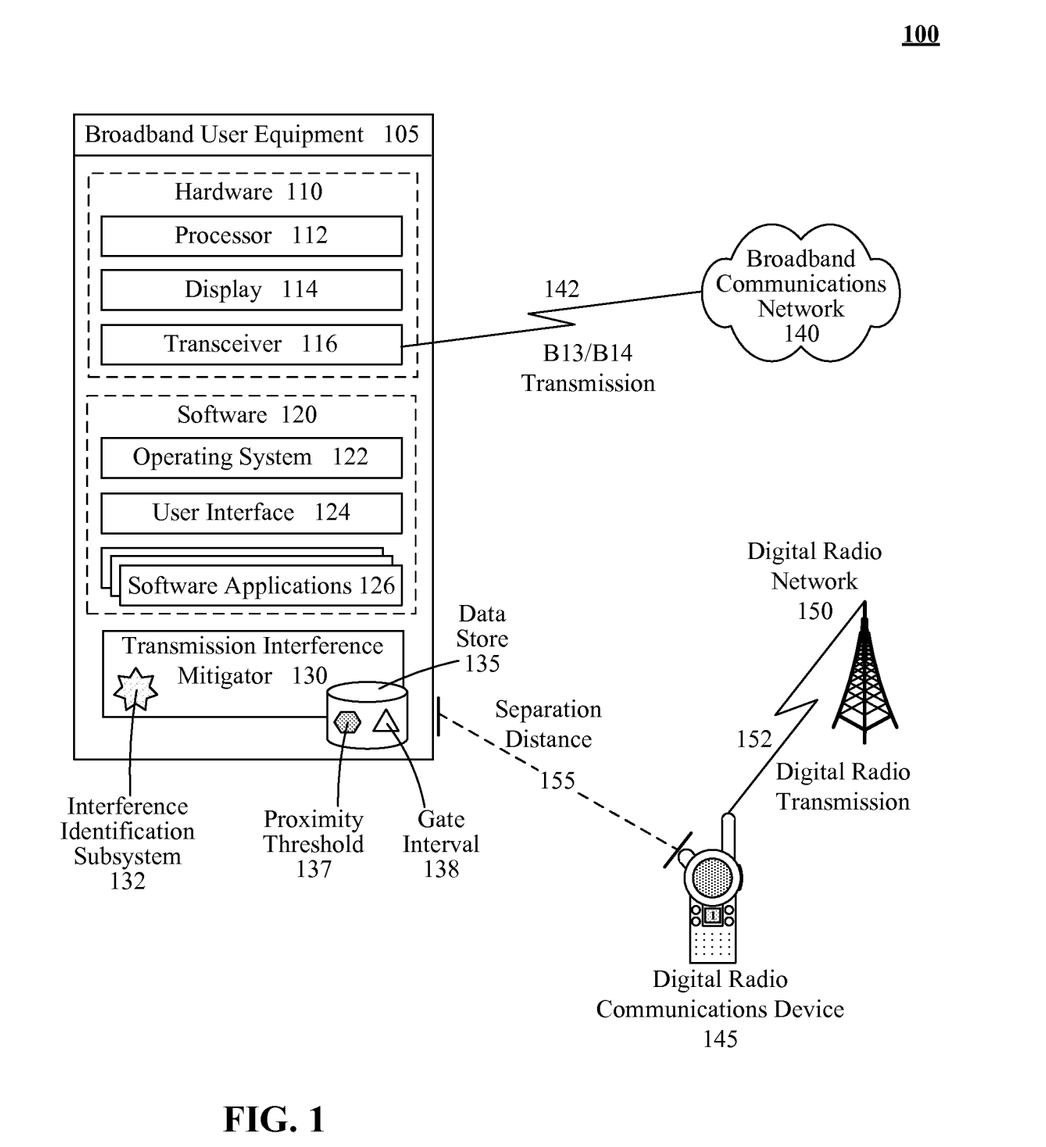
FIG. 1 illustrates a schematic diagram of a system for mitigating the interference between signals of broadband user equipment and a digital radio communications device in accordance with embodiments of the inventive arrangements disclosed herein.

FIG. 1 illustrates a schematic diagram of a system 100 for mitigating the interference between signals 142 and 152 of broadband user equipment 105 and a digital radio communications device 145, respectively, in accordance with embodiments of the inventive arrangements disclosed herein. In system 100, transmissions 142 in the B13 and/or B14 frequency bands of broadband user equipment 105 can interfere with the digital radio reception 152 of a digital radio communications device 145 when the two devices 105 and 145 are proximate to each other, since both the B13 and/or B14 transmission 142 and digital radio reception 152 use frequencies that are relatively close to each other.

The digital radio communications device 145 can represent an electronic device (e.g., two-way radio, land mobile radio, etc.) that uses a half-duplex configuration to communicate with other devices over a digital radio network 150. Since the technology regarding the digital radio communications device 145 and digital radio network 150 are well known in the art, only those details of particular import to the present invention shall be discussed herein.

In another embodiment, the digital radio network 150 can utilize components of the broadband communications network 140. In yet another embodiment, the digital radio network 150 can be communicatively linked to the broadband communications network 140, such as through an appropriate gateway.

The digital radio communications device 145 and digital radio network 150 can represent a system utilized by public safety organizations like those conforming to the Project 25 standards. For the sake of illustration, it can be assumed that digital radio reception 152 of public safety personnel are more important than the B13 and/or B14 transmissions 142 made by nearby broadband user equipment 105.

The broadband user equipment 105 can represent a variety of computing devices capable of exchanging B13 and/or B14 transmissions 142 with a broadband communications network 140, including, but not limited to a hand-held computing device, a portable data assistant (PDA), a cell phone, a smart phone, a laptop computer, a mobile data terminal (MDT), and the like. The broadband communications network 140 can represent the hardware and/or software components required to implement a communications system that supports the use of a wide or broad range of frequencies or bands, such as a long-term evolution (LTE) communications network.

Broadband technology (broadband user equipment 105 and broadband communications network 140) is well known in the art, and, as such, only those details and functionality utilized by the present invention shall be discussed herein.

The broadband user equipment 105 can be comprised of various hardware 110 and software 120 components. It should be noted that the broadband user equipment 105 can include additional hardware 110 and software 120 components to support other functionality without affecting this embodiment of the present invention.

The hardware 110 components can include a processor 112, display 114, a transceiver 116, and a data store 135. The processor 112 can correspond to the electronic circuitry configured to interpret and execute the instructions of the software 120 components. The display 114 can represent a viewing area in which data can be presented to a user of the broadband user equipment 105.

The transceiver 116 can be the component configured to exchange data with the broadband communications network 140. The transceiver 116 can utilize the frequency bands associated with B13 and/or B14 transmissions 142 to communicate with the broadband communications network 140.

The software 120 components of the broadband user equipment 105 can include an operating system 122, a user interface 124, and software applications 126. The operating system 122 can be the computer program configured to manage hardware 110 resources and provide a set of common services that support operation of the software applications 126. The software applications 126 can represent a variety of computer programs (e.g., computer-aided dispatch, push-to-talk, video communications, etc.) installed for use upon the broadband user equipment 105.

The user interface 124 can represent a specialized computer program designed to provide a basic interaction mechanism for a user. The user interface 124 can be abstractly thought of as a go-between for a user and the operating system 122 and/or software applications 126. That is, the user interface 124 can be for the broadband user equipment 105 and not a graphical user interface (GUI) of a specific software application 126.

The transmission interference mitigator 130 can represent an additional component installed within the broadband user equipment 105 to assist in minimizing interference between the B13 and/or B14 transmissions 142 of the broadband user equipment 105 when determined to be near a digital radio communications device 145. The transmission interference mitigator 130 can be comprised of hardware and/or software components, depending upon the specific implementation. When proximate to a digital radio communications device 145, the transmission interference mitigator 130 can gate the B13 and/or B14 transmissions 142 of the broadband user equipment 105.

It should be noted that gating of the B13 and/or B14 transmissions 142 by the transmission interference mitigator 130 can be performed in a variety of manners, such as buffering and/or discarding the data associated with B13 and/or B14 transmission 142. Additionally, the transmission interference mitigator 130 can include multiple methods of gating and the use of a particular method can be determined on per-application 126 basis.

For example, a time-insensitive application 126 like a Web browser can tolerate a method that delays or buffers the B13 and/or B14 transmissions 142 because receiving "old" data is not detrimental to the application 126 and/or user. However, a time-sensitive application 126 like a push-to-talk (PTT) voice application cannot tolerate delayed B13 and/or B14 transmissions 142 because "old" data is often worse than not receiving the data, which can lead to using a method that discards the B13 and/or B14 transmissions 142 for such applications 126.

Gating of the B13 and/or B14/B14 transmissions 142 can be performed in a variety of ways commensurate with the broadband user equipment 105 and/or transmission interference mitigator 130. For example, the bearer data transmission rate of the broadband user equipment 105 can be reduced by implementing a rate-limiting buffer below the IP stack, such as in the radio modem device driver software application 126 of the broadband user equipment 105.

In another embodiment, the bearers of the B13 and/or B14/B14 transmissions 142 can be suspended using a 3GPP-defined signaling method, such as an extended service request (ESR) message. In the 3GPP standards (3GPP TS 24301), an ESR message can be used for the purpose of suspending data bearers while the broadband user equipment 105 is servicing a circuit-switched voice call.

As applied to the present invention, the ESR message can be used to suspend the data bearers while the digital radio communications device 145 is proximate to the broadband user equipment 105. In this application, the suspension of the data bearers can trigger an "Interface Unavailable" indication to the IP stack or the connection management middleware of the broadband user equipment 105.

The transmission interference mitigator 130 can be configured to provide a visual indication in the user interface 124 that the B13 and/or B14 transmissions 142 are currently being gated. The specific visual indication used can be commensurate with the user interface 124 and display 114 of the broadband user equipment 105.

The transmission interference mitigator 130 can include an interference identification subsystem 132 and a data store 135 containing a proximity threshold 137 and gate interval 138. Data store 135 can correspond to a portion of a data storage device (not shown) of the broadband user equipment 105 allocated for use by the transmission interference mitigator 130 and/or a non-volatile data storage device integrated into the transmission interference mitigator 130 and separate to the data storage device of the broadband user equipment 105, depending upon the specific implementation of the transmission interference mitigator 130.

The proximity threshold 137 can define a maximum received digital radio signal power or a minimum distance 155 separating the broadband user equipment 105 and digital radio communications device 145 that requires the broadband user equipment 105 to gate B13 and/or B14 transmissions 142 in order to reduce interference with digital radio reception 152. The value for the proximity threshold 137 can be hard-coded or can be a user-configurable setting accessed through the user interface 124 or can be adjusted via well known Over The Air (OTA) device management methods. Configurability of the proximity threshold 137 can allow the transmission interference mitigator 130 to be fine-tuned on a user or situational basis (i.e., static vs. transient co-located devices).

For example, Officer A always carries broadband user equipment 105 and a digital radio communications device 145. Therefore, Officer A can specify a lower proximity threshold 137 since the devices 105 and 145 have a small separation distance 155 (static co-location). Officer B, who only carries broadband user equipment 105, can set a higher proximity threshold 137 to account for entering/leaving the broadcast range of various users of digital radio communications devices 145 while working (transient co-location).

It should be noted that the present invention can be incorporated into commercial band 13 long-term evolution (LTE) devices 105 with a high proximity threshold 137 in order to gate B13 transmissions 142 when a public safety digital radio communications device 145 is detected within their proximity.

The gate interval 138 can define a time period that the transmission interference mitigator 130 gates the B13 and/or B14 transmissions 142 of the broadband user equipment 105. The gate interval 138 can have a default setting to represent the average amount of time required for a response to a transmission like a value between five and fifteen seconds. Like the proximity threshold 137, the gate interval 138 can be configured using the user interface 124 to provide user-customization.

In another contemplated embodiment, the gate interval 138 can be dynamically set by the transmission interference mitigator 130 in accordance with an adaptive algorithm that monitors the local environment. For example, the transmission interference mitigator 130 can set a larger gate interval 138 when multiple digital radio communications devices 145 are within the proximity threshold 137. As another example, the transmission interference mitigator 130 can track transmission and response times to identify timing patterns, and predict the adjustment of the gate interval 138 based upon those timing patterns.

The interference identification subsystem 132 can be the component of the transmission interference mitigator 130 that identifies situations where there is the potential for the B13 and/or B14 transmissions 142 of the broadband user equipment 105 to interfere with the digital radio reception 152 of the digital radio communications device 145. Implementation of the interference identification subsystem 132 can utilize different means of identifying interference potential, depending on the components of the digital radio communications device 145, as shown FIGS. 2 and 3.

In another contemplated embodiment, the broadband user equipment 105 can include multiple implementations of the interference identification subsystem 132, expanding the models of digital radio communications devices 145 that the transmission interference mitigator 130 is capable of handling. In such an embodiment, the transmission interference mitigator 130 can be configured to utilize the different implementations of the interference identification subsystem 132 in a preset order (i.e., attempt Method A; if Method A fails, attempt Method B; and so on).

Broadband and digital radio communications networks 140 and 150 can include any hardware/software/and firmware necessary to convey data encoded within carrier waves. Data can be contained within analog or digital signals and conveyed though data or voice channels. Broadband and digital radio communications networks 140 and 150 can include local components and data pathways necessary for communications to be exchanged among computing device components and between integrated device components and peripheral devices. Broadband and digital radio communications networks 140 and 150 can also include network equipment, such as routers, data lines, hubs, and intermediary servers which together form a data network, such as the Internet. Broadband and digital radio communications networks 140 and 150 can also include circuit-based communication components and mobile communication components, such as telephony switches, modems, cellular communication towers, and the like.

As used herein, presented data store 135 can be a physical or virtual storage space configured to store digital information. Data store 135 can be physically implemented within any type of hardware including, but not limited to, a magnetic disk, an optical disk, a semiconductor memory, a digitally encoded plastic memory, a holographic memory, or any other recording medium. Data store 135 can be a stand-alone storage unit as well as a storage unit formed from a plurality of physical devices. Additionally, information can be stored within data store 135 in a variety of manners. For example, information can be stored within a database structure or can be stored within one or more files of a file storage system, where each file may or may not be indexed for information searching purposes. Further, data store 135 can utilize one or more encryption mechanisms to protect stored information from unauthorized access.

Figure 2:
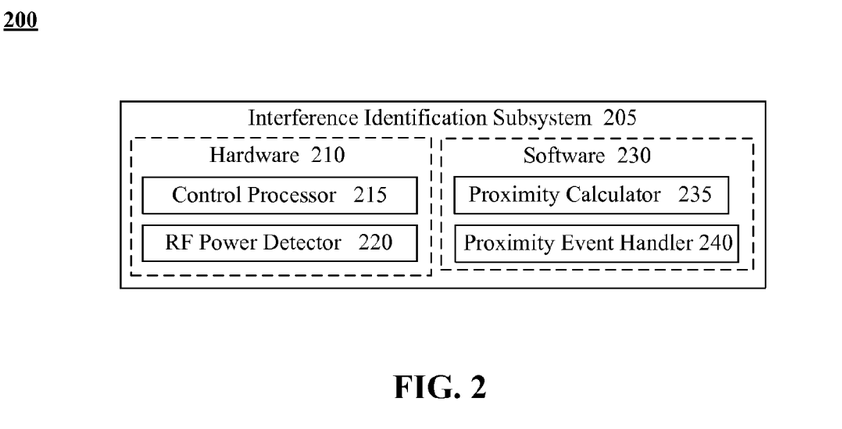
FIG. 2 is a block diagram of a system depicting an interference identification subsystem for use with general digital radio communications devices in accordance with embodiments of the inventive arrangements disclosed herein.

FIG. 2 is a block diagram of a system depicting an interference identification subsystem 205 for use with general digital radio communications devices in accordance with embodiments of the inventive arrangements disclosed herein. System 200 can illustrate a specific embodiment of the interference identification subsystem 132 of FIG. 1.

In system 200, the interference identification subsystem 205 can identify the potential for interference by determining the separation distance 155 to a digital radio communications device 145. The determination of the separation distance 155 can be based upon the received signal strength of the digital radio transmission 152.

Interference identification subsystem 205 can utilize hardware 210 and software 230 components. The hardware 210 components can include a control processor 215 and a radio frequency (RF) power detector 220. The control processor 215 can represent the electronic component used by the interference identification subsystem 205 to interpret and execute the instructions of the software 230 components. The control processor 215 can be similar in functionality to the processor 112 of the broadband user equipment 105 in FIG. 1.

The control processor 215 can be connected to the processor 112 of the broadband user equipment 105 by well-known means. This coupling can allow for the control processor 215 to instruct the processor 112 to gate the B13 and/or B14 transmissions 142 of the broadband user equipment 105.

The RF power detector 220 can represent the electronic circuitry configured to detect the digital radio transmissions 152 (RF signals), such as an RF diode detector or a logarithmic amplifier. The RF power detector 220 can include the appropriate signal filtering components so as to focus the RF power detector 220 on the specific frequencies used by the digital radio communications device 145.

The software 230 components of the interference identification subsystem 205 can include a proximity calculator 235 and a proximity event handler 240. The proximity calculator 235 can be a computer program configured to determine the separation distance 155 of the digital radio communications device 145 based upon the received signal strength determined by the RF power detector 220.

The proximity event handler 240 can be a computer program configured to compare the separation distance 155 calculated by the proximity calculator 235 to the proximity threshold 137 to determine if a proximity event (not shown) is triggered. Triggering of a proximity event can result in the interference identification subsystem 205 indicating to the transmission interference mitigator 130 that its B13 and/or B14 transmissions 142 need to be gated.

Since the interference identification subsystem 205 of system 200 bases its detection on the power of the digital radio transmission 152, the interference identification subsystem 205 can be used with a broad range of digital radio communications devices 145. Conversely, by basing its detection on the received power of the digital radio transmission 152, the reaction of the interference identification subsystem 205 can be delayed. That is, after a user of the digital radio communications device 145 releases the transmit button, a small amount of time can elapse where the interference identification subsystem 205 performs its calculations to predict proximity and actions for gating B13 and/or B14 transmissions 142.

Figure 3:
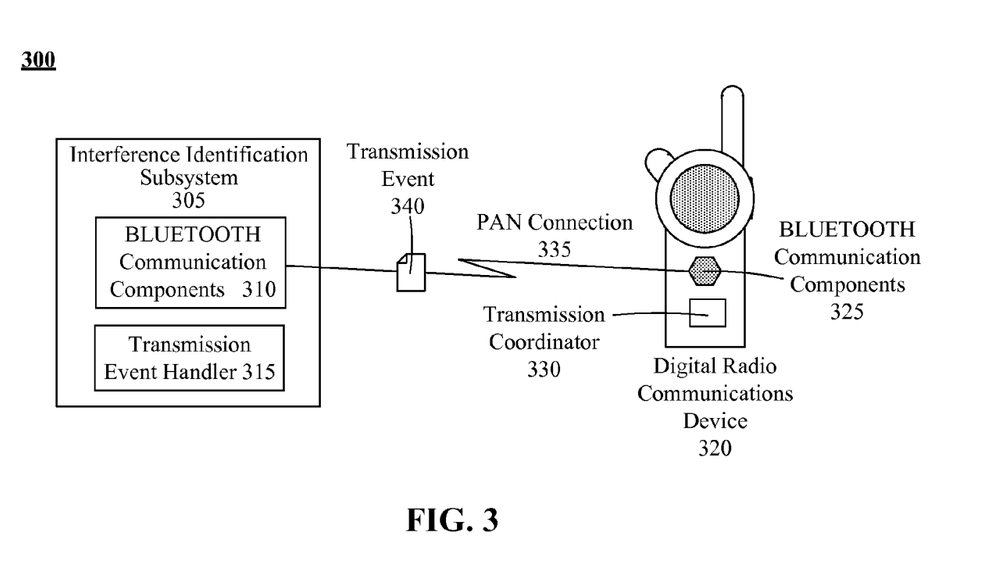
FIG. 3 is a schematic diagram of a system illustrating an interference identification subsystem for use with a digital radio communications device having BLUETOOTH communications components in accordance with embodiments of the inventive arrangements disclosed herein.

FIG. 3 is a schematic diagram of a system 300 illustrating an interference identification subsystem 305 for use with a digital radio communications device 320 having BLUETOOTH communications components 325 in accordance with embodiments of the inventive arrangements disclosed herein. System 300 can illustrate a specific embodiment of the interference identification subsystem 132 of FIG. 1.

While the prediction method illustrated by system 200 of FIG. 2 is acceptable in most situations, the interference mitigation efficacy can be improved by system 300. In system 300, the interference identification subsystem 305 of the broadband user equipment 105 can identify situations of potential interference based on data exchanged with the digital radio communications device 320 over a personal area network (PAN) connection 335.

The PAN connection 335 can be a BLUETOOTH communications channel established between the BLUETOOTH communication components 310 and 325 of the interference identification subsystem 305 and digital radio communications device 320, respectively. The PAN connection 335 can be automatically established when the broadband user equipment 105 and digital radio communications device 320 move within range of each other.

The BLUETOOTH communication components 310 and 325 can represent the hardware and software elements necessary to implement BLUETOOTH communications. Typically, BLUETOOTH communication components 310 and 325 can include an antenna, BLUETOOTH hardware and firmware (i.e., BLUETOOTH radio and link controller), a BLUETOOTH software protocol stack, and a BLUETOOTH software application (i.e., the transmission event handler 315 and transmission coordinator 330).

The transmission coordinator 330 of the digital radio communications device 320 can be a BLUETOOTH software application configured to send the interference identification subsystem 305 transmission events 340 over the PAN connection 335. A transmission event 340 can be an electronic message containing data about a digital radio transmission 152 of the digital radio communications device 320.

For example, a transmission event 340 can indicate that the digital radio communications device 320 has completed receiving a digital radio transmission 152. Depending upon the specific implementation of the transmission coordinator 330 and/or interference identification subsystem 305, a transmission event 340 can include additional data, such as user identification, quality of service (QoS) parameters, and a priority of the digital radio transmission 152.

The transmission event handler 315 of the interference identification subsystem 305 can perform actions based on the contents of received transmission events 340. When indicated by the transmission event 340, the transmission event handler 315 can trigger the gating of the B13 and/or B14 transmissions 142 of the broadband user equipment 105.

Further, the transmission event handler 315 can send the transmission coordinator 330 of the digital radio communications device 320 responses (not shown) over the PAN connection 335 in order to synchronize the transmissions of the broadband user equipment 105 and the digital radio communications device 320.

Figure 4:
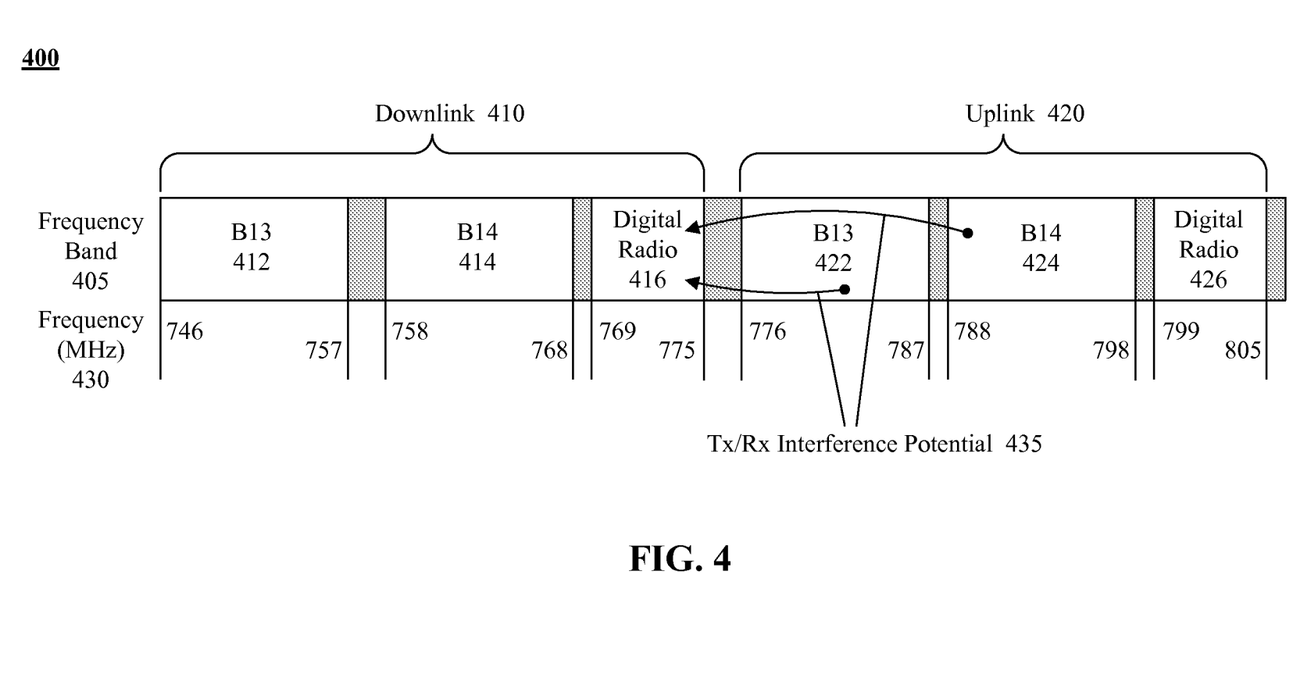
FIG. 4 is a frequency band diagram illustrating the interference potential between broadband user equipment and digital radio communications devices in accordance with embodiments of the inventive arrangements disclosed herein.

FIG. 4 is a frequency band diagram 400 illustrating the interference potential 435 between broadband user equipment and digital radio communications devices in accordance with embodiments of the inventive arrangements disclosed herein. Frequency band diagram 400 can be utilized by devices 105 and/or 320 of systems 100 of FIGS. 1 and 3.

Frequency band diagram 400 can visually illustrate the proximity of the frequency 430 ranges for the frequency bands 405 generally used by digital radio communications devices and broadband user equipment. In this embodiment of the present invention, the frequency bands 405 of importance can include Band 13 (B13) 412 and 422 and Band 14 (B14) 414 and 424 used by broadband user equipment, and the frequency band 405 utilized by P25 digital radio communications devices 416 and 426.

One skilled in the art would recognize that the present invention can apply to other similar situations where narrowband digital radio and broadband user equipment have been allocated spectrum near each other. When narrowband digital receivers have frequency allocations near broadband uplink bands, the present invention can be used to protect the narrowband receiver from interference from the broadband device.

In this example, both the broadband user equipment and digital radio communications device can operate using frequency bands 405 within the 700 MHz frequency range, spanning from 746 MHz to 805 MHz. As shown in the frequency band diagram 400, each frequency band 405 can have a downlink 410 (receiving) frequency 430 range and an uplink 420 (transmitting) frequency 430 range.

Since a digital radio communications device utilizes a half-duplex configuration (i.e., does not transmit, Tx, when receiving, Rx), transmissions sent on B13 422 and/or B14 424 can occur simultaneous with digital radio 426 transmissions without causing interference. The potential 435 for interference can exist when transmissions sent on B13 422 and/or B14 424 occur when the digital radio 416 is receiving transmissions, as indicated by the arrows.

The Tx/Rx interference potential 435 can be attributed to the closeness of the B13 422 and B14 424 transmit frequency 430 ranges to the digital radio 416 receiving frequency 430 range. As shown in the frequency band diagram 400, the minimum frequency 430 for a B13 422 transmission can be only 2 MHz away from the maximum frequency 430 of digital radio 416 reception; a B14 424 transmission can be separated by 13 MHz.

Figure 5:
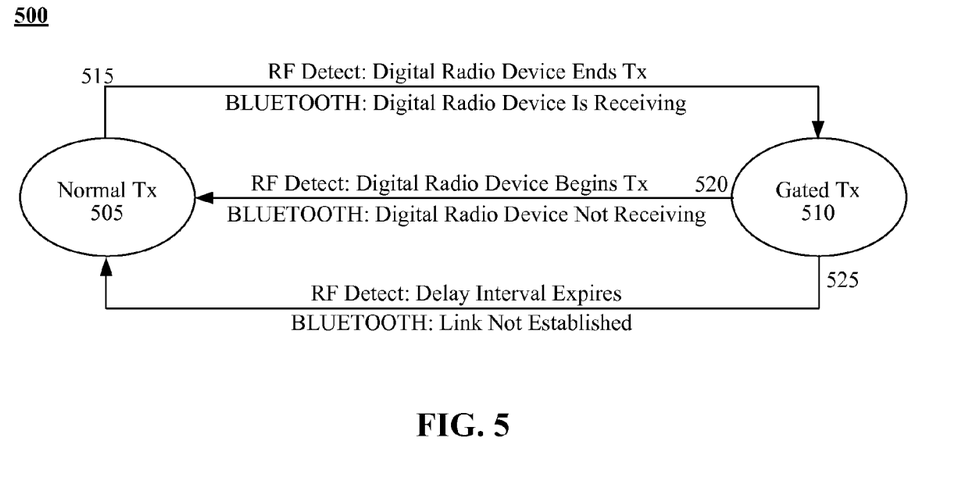
FIG. 5 is a state diagram describing the state changes of the broadband user equipment when mitigating interference with a digital radio communications device in accordance with embodiments of the inventive arrangements disclosed herein.

FIG. 5 is a state diagram 500 describing the state changes of the broadband user equipment when mitigating interference with a digital radio communications device in accordance with embodiments of the inventive arrangements disclosed herein. State diagram 500 can be utilized within the context of systems 100, 200, and/or 300.

In the state diagram 500, the broadband user equipment can operate in a normal transmit (Tx) state 505 or a gated Tx state 510. Let us assume that the broadband user equipment begins operation in the normal Tx state 505. The occurrence of event 515 can transition the broadband user equipment from the normal Tx state 505 to the gated Tx state 510.

Event 515 can be expressed in two ways, dependent upon the implementation of the interference identification subsystem. The RF power detector can determine that the digital radio device has ended its transmission, and, is, therefore, potentially receiving a response. Alternately, the broadband user equipment can be informed via the BLUETOOTH connection that the digital radio device is receiving.

Once in the gated Tx state 510, the broadband user equipment can return to the normal Tx state 505 by event 520 or event 525. Event 520 can represent the determination that the digital radio device has begun transmission or is no longer receiving. Event 525 can correspond to the expiration of the gate interval or the inability to establish a BLUETOOTH link with the digital radio device.

Figure 6:
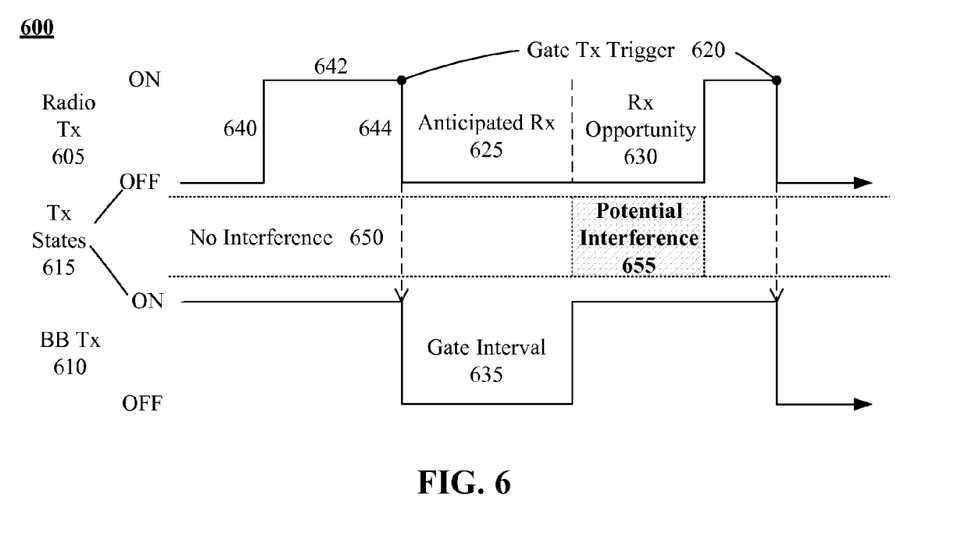
FIG. 6 is a timing diagram correlating transmissions of the digital radio and broadband communications devices in accordance with embodiments of the inventive arrangements disclosed herein.

FIG. 6 is a timing diagram 600 correlating transmissions of the digital radio 605 and broadband communications 610 devices in accordance with embodiments of the inventive arrangements disclosed herein. The timing diagram 600 can further illustrate how the state changes of FIG. 5 can relate to the transmitter states 615 of the digital radio 605 and broadband (BB) devices 610. Both the radio 605 and BB 610 transmitters can switch between an ON and an OFF transmitter state 615 (i.e., transmitting and not transmitting).

In the example shown in timing diagram 600, the radio transmitter 605 can start in the OFF state 615 and the BB transmitter 610 can begin in the ON state 615, which can represent the broadband user equipment operating in the normal Tx state 505. As time progresses, the radio transmitter 605 can switch to the ON state 615, representing message transmission and can then return to the OFF state 615 once the transmission is terminated.

Take for example, an officer calling in an accident over the radio. The officer can depress the transmit button of the digital radio device, activating the radio transmitter 605. Activation of the radio transmitter 605 can be represented by line 640; the radio transmitter 605 transitions from OFF to ON 615.

The officer would then speak into the digital radio device while depressing the transmit button. Since the transmit button is kept depressed, the radio transmitter 605 can remain in the ON state 615, as shown by line 642. When the officer is finished speaking, the transmit button can be released, causing the radio transmitter 605 to transition back to the OFF state 615 as represented by line 644.

The completion of a transmission, indicated by the release of the transmit button that causes the radio transmitter 605 to transition from the ON state to the OFF state 615, can be used as the trigger 620 for the broadband user equipment to begin gating its transmissions. This can correspond to event 515 of the state diagram 500 where the broadband user equipment transitions from the normal Tx state 505 to the gated Tx state 510.

The gate Tx trigger 620 can represent the event that the interference identification subsystem of the transmission interference mitigator is designed to detect. Up until the point in time represented by the gate Tx trigger 620, both the radio transmitter 605 and BB transmitter 610 can operate proximate to each other without interference 650.

Once the gate Tx trigger 620 is detected by the interference identification subsystem, the transmission interference mitigator can cause the BB transmitter 610 to transition from ON to OFF 615. The BB transmitter 610 can remain in the OFF state 615 for the duration of the gate interval 635, which can equal the amount of time the digital radio device is anticipated 625 to be receiving a response to the transmission. That is, the BB transmitter 610 can halt transmissions when the gate Tx trigger 620 is detected and wait for the gate interval 635 to elapse.

Upon expiration of the gate interval 635, event 525 of the state diagram 500, the BB transmitter 610 can switch back to the ON state 615 or transition from the gated Tx state 510 to the normal Tx state 505 until the next gate Tx trigger 620 is detected.

As shown in the timing diagram 600, when the BB transmitter 610 resumes transmitting upon expiration of the gate interval 635, there can be an opportunity 630 for the digital radio device to continue receiving its response. For the amount of time corresponding to this opportunity 630, the potential for interference 655 between the BB transmitter 610 and the digital radio receiver (not shown) can exist.

However, it should be noted that the potential interference 655 associated with this opportunity 630 can be minimal, and is, in fact, less than current situations involving proximate digital radio and broadband devices. Since conventional broadband user equipment lacks the functionality of the transmission interference mitigator, the BB transmitter 610 can remain in the ON state 615 while the digital radio device is anticipating receipt 625 of a response. As such, the potential interference 655 would, using the current timing diagram 600, begin at line 644 and span the time in which the digital radio device anticipates 625 receiving a response and has the opportunity 630 to receiving a response.

Figure 7:
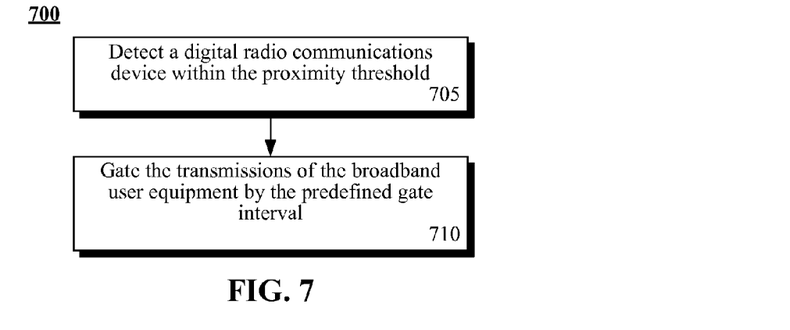
FIG. 7 is a flowchart of a method describing the high-level operation of the transmission interference mitigator operating on broadband user equipment in accordance with embodiments of the inventive arrangements disclosed herein.

FIG. 7 is a flowchart of a method 700 describing the high-level operation of the transmission interference mitigator operating on broadband user equipment in accordance with embodiments of the inventive arrangements disclosed herein. Method 700 can be performed within the context of systems 100, 200, and/or 300, and/or in conjunction with methods 800 and/or 820 of FIG. 8.

Method 700 can begin in step 705 where the transmission interference mitigator can detect a digital radio communications device within its proximity threshold. The transmissions of the broadband user equipment can then be gated by the predefined gate interval in step 710.

Step 705 can be performed in different manners that are commensurate with the specific embodiment of the interference identification subsystem of the transmission interference mitigator.

Figure 8:
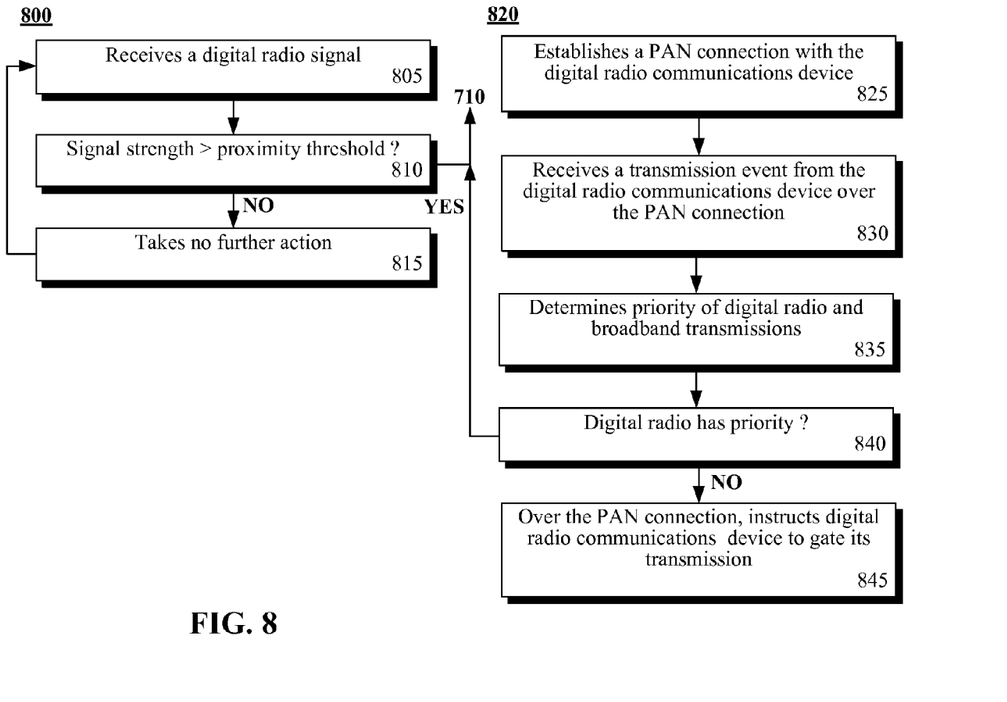
FIG. 8 illustrates two methods describing the detection of a digital radio communications device within close proximity by an interference identification subsystem in accordance with embodiments of the inventive arrangements disclosed herein.

FIG. 8 illustrates two methods 800 and 820 describing the detection of a digital radio communications device within close proximity by an interference identification subsystem in accordance with embodiments of the inventive arrangements disclosed herein. Methods 800 and 820 can detail the performance of step 705 of method 700 for two contemplated embodiments of the interference identification subsystem.

Method 800 can correspond to the embodiment of the interference identification subsystem using an RF power detector circuit and can begin with the receipt of a digital radio signal in step 805. In step 810, it can be determined if the strength of the received signal is greater than the proximity threshold.

When the received signal is stronger than the proximity threshold, step 710 of method 700 can be executed. When the received signal is not stronger, the interference identification subsystem can take no further action in step 815. From step 815, flow of method 800 can return to step 805 to continue monitoring digital radio signals.

Method 820 can correspond to the embodiment of the interference identification subsystem that utilizes BLUETOOTH communications contained in the broadband user equipment and digital radio communications device. Method 820 can begin in step 825 where a PAN connection can be established with the digital radio communications device.

The interference identification subsystem can then receive a transmission event from the digital radio communications device over the PAN connection in step 830. In step 835, the priority of the digital radio and broadband transmissions can be determined.

While it is assumed that digital radio communications should take priority, step 835 can illustrate how the concepts of the present invention can be expanded to include message priorities and/or quality of service (QoS) requirements. This can be of particular importance when the digital radio communications network and the broadband communications network are integrated or share components.

It can be ascertained if the digital radio communication has priority in step 840. When the digital radio communication does not have priority, step 845 can execute where the transmission interference mitigator can instruct the digital radio communications device to gate its transmission via the PAN connection.

Step 845 can be modified in accordance with the functionality supported by the particular digital radio communications device to achieve gated transmission. For example, the digital radio communications device can have the ability to buffer or discard its transmission data during the gate interval.

One skilled in the art would also recognize that the present invention can be used to protect narrowband digital radio communications devices when broadband devices have been allocated nearby spectrum for use as time division duplexing (TDD) instead of frequency division duplexing (FDD), as shown in FIG. 2. For TDD communication links, the same frequency can be used for both downlink and uplink. However, downlink and uplink communication can be separated in time. Typically, a communication frame can be defined that contains one or more contiguous regions of uplink and one or more contiguous regions of downlink. The timing diagram 500 of FIG. 5 would still apply when broadband links are TDD, but the uplink transmissions would be gated in each TDD broadband communication frame because TDD downlink transmissions do not interfere, and, therefore, would not need to be gated.

Further, one skilled in the art would recognize that the present invention can be utilized to protect narrowband digital radio communications devices when broadband devices have been allocated for communication networks other than LTE, such as Worldwide Interoperability for Microwave Access (WiMAX).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method for mitigating radio frequency interference comprising:
   detecting, at a broadband device, a narrowband transmission from a narrowband communication device, wherein the narrowband transmission is in close enough proximity to at least one bearer channel of the broadband device to result in interference on the narrowband reception when the broadband device is transmitting and the narrowband communication device is receiving concurrently, and further wherein the narrowband communication device and the broadband device are separate devices;
   responsive to the detecting, determining, by the broadband device, that the narrowband communication device is proximate to the broadband device; and
   responsive to determining that the narrowband communication device is proximate to the broadband device, gating, by the broadband device, a broadband transmission to ensure that the broadband transmission does not interfere with the proximate narrowband reception, wherein in absence of detecting the narrowband transmission the broadband transmission from the broadband device would not be gated.

2. The method of claim 1, wherein determining that the narrowband communication device is proximate to the broadband communication device is based on a received signal strength of the narrowband transmission.

3. The method of claim 1, wherein the gating of the broadband transmission is for a previously established time between five and fifteen seconds.

4. The method of claim 1, wherein the gating of the broadband transmission is for a user-configurable time, which is configurable at the broadband device.

5. The method of claim 1, wherein the broadband device is a 3GPP-conforming network communication device that communicates with a mobile broadband network, wherein the narrowband device is a two-way radio that communicates with a base station and other two-way radios.

6. The method of claim 1, further comprising:
   utilizing, by the broadband device, a wireless personal area network (PAN) transceiver to detect reception indication data conveyed by the narrowband communication device over a personal area network, wherein the broadband device uses the reception indication data to gate the broadband transmission while any proximate narrowband reception from the narrowband communication device is occurring.

7. The method of claim 1, further comprising:
   detecting a transmission termination from the narrowband device using a radio frequency (RF) power detector component of the broadband device;
   at the time of the detection of the transmission termination, determining that the broadband device is transmitting data that is likely to cause interference after the detected transmission termination;
   halting transmission of the data being transmitted from the broadband device;
   waiting for a delay period of a previously determined time between five and fifteen seconds; and
   after the delay period, automatically enabling transmission of data from the broadband device.

8. The method of claim 1, further comprising:
   establishing a personal area network (PAN) connection between PAN components of the broadband device and the narrowband communication device;
   conveying data over the PAN connection from the narrowband communication device to the broadband device to indicate when receptions from the narrowband communication device are occurring;
   at the time that receptions are occurring from the narrowband device, as determined from the data conveyed over the PAN connection, determining that the broadband device is to transmit data that is likely to cause interference with the detected reception;
   halting transmission of the data from the broadband device for periods where the narrowband communication device is receiving, as determined from the data conveyed over the PAN connection; and
   automatically enabling transmission of data from the broadband device when the narrowband communication device is no longer receiving, as determined from the data conveyed over the PAN connection.

9. The method of claim 1, further comprising:
   responsive to gating, determining whether gated transmissions are to be buffered for later transmission or discarded, wherein determining whether gated transmissions are to be buffered for later transmission or discarded utilizes one or more of: data traffic type, quality of service, duration of gating period;
   if results of the determining indicate gated transmissions are to be buffered, buffering, by the broadband device, the gated transmission for a duration after which the gated transmissions are transmitted by the broadband device; and
   if results of the determining indicate gated transmissions are to be discarded, discarding, by the broadband device, the gated transmissions.

10. The method of claim 1, wherein the gating further comprises one or more of:
- implementing a rate-limiting buffer below the IP stack to gate the broadband transmission; and
- utilizing a 3GPP-defined signaling method to suspend the broadband transmission.

11. A computer program product for mitigating radio frequency interference between two proximate communication devices, the computer program product comprising:
- one or more computer-readable, tangible storage devices;
- program instructions, stored on at least one of the one or more storage devices, to detect at a broadband device, a narrowband transmission from a narrowband communication device, wherein the narrowband transmission is in close enough proximity to at least one bearer channel of the broadband device to result in interference on the narrowband reception when the broadband device is transmitting and the narrowband communication device is receiving concurrently, and further wherein the broadband device and the narrowband communication device are separate devices; and
- program instructions, stored on at least one of the one or more storage devices, to, responsive to detecting the narrowband transmission, determine at the broadband device that the narrowband communication device is proximate to the broadband device, and further to gate a broadband transmission to ensure the broadband transmission does not interfere with the proximate narrowband reception, wherein in absence of detecting the narrowband transmission the broadband transmission from the broadband device would not be gated.

12. The computer program product of claim 11, wherein determining that the narrowband communication device is proximate to the broadband communication device is based on received signal strength of the narrowband transmission.

13. A system for mitigating RF interference between a narrowband radio communications device and a 3GPP conforming network communications device comprising:
- a narrowband radio communications device configured to transmit and receive narrowband communications; and
- a 3GPP-conforming network communications device, separate from the narrowband radio communications device, configured to communicate with a 3GPP-conforming network, and wherein the 3GPP-conforming network communications device further is configured to:
- detect a narrowband transmission from the narrowband communication device, wherein the narrowband transmission is in close enough proximity to at least one bearer channel of the broadband device to result in interference on the narrowband reception when the broadband device is transmitting and the narrowband communication device is receiving concurrently;
- responsive to the detecting, determine that the narrowband communication device is proximate to the broadband device; and
- mitigate the potential for interference between the narrowband radio communications device and the 3GPP-conforming network communications device by selectively throttling transmissions of the 3GPP-conforming network communications device when receptions of the narrowband radio communications device are likely to be occurring within close proximity to the 3GPP-conforming network communication device, wherein the 3GPP conforming network communications device and the narrowband radio communications device are two separate devices.

14. The system of claim 13, wherein the narrowband communications are in close enough proximity to at least one bearer channel of the 3GPP-conforming network communications device to result in interference on the narrowband communications when the narrowband radio communications device and the 3GPP-conforming network communications device are concurrently transmitting and receiving.

15. The system of claim 13, wherein said 3GPP-conforming network communications device further is configured to:
- detect a received signal strength of narrowband transmissions from the narrowband radio communications device;
- define a quantity of time that transmissions of the 3GPP-conforming network communications device are to be selectively gated, wherein the 3GPP-conforming network communications device is configured to gate transmissions for the quantity of time responsive to the 3GPP-conforming network communications device detecting termination of the narrowband transmissions, wherein the quantity of time is between five and fifteen seconds, which represents a time delay expected for a person to respond to a two-way radio voice communication prompt.

16. The system of claim 15, wherein the 3GPP-conforming network device is configured to determine that the receptions of the narrowband radio communications device are likely to be occurring within close proximity to the 3GPP-conforming network communication device based on the received signal strength of transmissions from the narrowband radio communications device.

17. The system of claim 15, wherein the 3GPP-conforming network device is configured to:
- detect when narrowband transmissions from the narrowband radio communications device stops; and
- gate otherwise unabated transmissions from the 3GPP-conforming network communications device responsive to detecting that narrowband radio communications device has stopped its transmissions.

18. The system of claim 13, wherein
- the narrowband radio communications device comprises a personal area network transceiver configured to convey data over a wireless personal area network to indicate within data when receptions of the narrowband radio communications device start and stop; and
- the 3GPP-conforming network communications device comprises a personal area network transceiver configured to receive data over the wireless personal area network and to coordinate transmissions of the 3GPP-conforming network communications device to occur when no receptions are occurring from a narrowband radio communications device within personal area network range of the 3GPP-conforming network communications device.

19. The system of claim 18, wherein the 3GPP-conforming network communications device is configured to mitigate the potential for interference by establishing a priority level for transmissions from the 3GPP-conforming network communications device and a priority level for receptions from the narrowband radio communications device, wherein data conveyed over the personal area network ensures that whichever of the 3GPP-conforming network device and the narrowband radio communication device having the lowest priority will gate transmissions while receptions by the other one of the devices is occurring, and wherein the personal area network transceiver of the narrowband radio communications device and of the 3GPP-conforming network communications device are each BLUETOOTH transceivers.

20. The system of claim 18, wherein the personal area network transceiver of the narrowband radio communications device is configured to transmit messages over the personal area network when narrowband receptions of the narrowband radio communications device start and end, and wherein the 3GPP-conforming network device is configured to use knowledge of when the narrowband radio communications device starts and ends its receptions to ensure that no transmissions from the 3GPP-conforming network communications device are occurring concurrent with receptions of the narrowband communications device.

* * * * *